(12) United States Patent
Yeoum et al.

(10) Patent No.: US 9,866,686 B2
(45) Date of Patent: Jan. 9, 2018

(54) METHOD AND APPARATUS FOR PERFORMING NETWORK REGISTRATION THROUGH A SELECTED COMPONENT FOR DATA SERVICE

(71) Applicant: Samsung Electronics Co., Ltd., Gyeonggi-do (KR)

(72) Inventors: Tae Sun Yeoum, Seoul (KR); Hyong Jin Ban, Gyeonggi-do (KR); Sang Soo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/955,914

(22) Filed: Dec. 1, 2015

(65) Prior Publication Data
US 2016/0157085 A1 Jun. 2, 2016

(30) Foreign Application Priority Data
Dec. 1, 2014 (KR) .................. 10-2014-0169987

(51) Int. Cl.
| H04W 4/00 | (2009.01) |
| H04M 3/42 | (2006.01) |
| H04M 3/38 | (2006.01) |
| H04L 29/08 | (2006.01) |
| H04W 8/18 | (2009.01) |
| H04W 8/20 | (2009.01) |

(52) U.S. Cl.
CPC ...... *H04M 3/42136* (2013.01); *H04L 67/306* (2013.01); *H04M 3/387* (2013.01); *H04W 8/183* (2013.01); *H04W 8/205* (2013.01)

(58) Field of Classification Search
CPC . H04W 88/06; H04W 8/183; H04W 36/0066; H04W 36/04; H04W 60/005; H04W 48/18; H04W 36/0083; H04W 48/20; H04W 4/001; H04W 68/12; H04W 88/10; H04W 8/20; H04M 2250/14
USPC ............ 455/552.1, 434, 435.1, 435.2, 550.1, 455/556.1, 557
See application file for complete search history.

(56) References Cited

U.S. PATENT DOCUMENTS

| 8,761,729 | B2 | 6/2014 | Naito et al. | |
| 2006/0172772 | A1* | 8/2006 | Bjorkner | H04W 8/205 455/558 |
| 2012/0115439 | A1 | 5/2012 | Naito et al. | |
| 2012/0123870 | A1* | 5/2012 | Denman | G06Q 30/0241 705/14.66 |
| 2012/0135715 | A1* | 5/2012 | Kang | H04W 8/183 455/412.1 |

(Continued)

FOREIGN PATENT DOCUMENTS

| JP | 2012105075 | 5/2012 |
| KR | 100825866 | 4/2008 |

*Primary Examiner* — Fred Casca
(74) *Attorney, Agent, or Firm* — The Farell Law Firm, P.C.

(57) ABSTRACT

An electronic device is provided, which includes a removable SIM, a secure memory configured to store at least one profile, a processor configured to select at least one of the removable SIM and the secure memory, to be used for packet data transmission and reception, in response to an occurrence of a data service change event, and a communication interface configured to perform network registration through the selected at least one of the removable SIM and the secure memory and to transmit and receive packet data through the registered network.

14 Claims, 11 Drawing Sheets

(56) References Cited

U.S. PATENT DOCUMENTS

| | | | |
|---|---|---|---|
| 2012/0270602 A1* | 10/2012 | Card | G06F 13/4291 |
| | | | 455/558 |
| 2013/0281085 A1 | 10/2013 | Sen et al. | |
| 2013/0344864 A1 | 12/2013 | Park et al. | |
| 2014/0057558 A1* | 2/2014 | Cooper | H04W 12/06 |
| | | | 455/41.1 |
| 2014/0364118 A1* | 12/2014 | Belghoul | H04W 4/003 |
| | | | 455/435.1 |
| 2015/0327207 A1* | 11/2015 | Bharadwaj | H04W 8/04 |
| | | | 455/435.2 |

* cited by examiner

METHOD AND APPARATUS FOR PERFORMING NETWORK REGISTRATION THROUGH A SELECTED COMPONENT FOR DATA SERVICE

PRIORITY

This application claims priority under 35 U.S.C. §119(a) to Korean Patent Application Serial number 10-2014-0169987, which was filed in the Korean Intellectual Property Office on Dec. 1, 2014, the entire disclosure of which is incorporated herein by reference.

BACKGROUND

1. Field of the Disclosure

The present disclosure relates generally to a method and an electronic apparatus for providing a data service, and more particularly, to a method and an electronic apparatus for performing network registration through a selected component and performing the data service through the registered network.

2. Description of Related Art

Unlike conventional removable cards such as subscriber identifier module (SIM) cards, universal subscriber identifier module (USIM) cards, and universal integrated circuit card (UICC), an embedded UICC (eUICC), or an embedded SIM (eSIM) is mounted in an electronic device in the form of a chip when the electronic device is manufactured, and may not be removed by a user. The eUICC or the eSIM may download a profile in an over the air (OTA) manner to allow a user to change an operator. Furthermore, one eUICC or eSIM may support a plurality of profiles.

SUMMARY

The present disclosure is made to provide at least the advantages described below.

Accordingly, an aspect of the present disclosure is to provide a method and an electronic apparatus for providing a data service.

Another aspect of the present disclosure is to provide a method and an electronic apparatus for providing a data service and an electronic apparatus for performing network registration through a selected component of the electronic apparatus and performing a data service through the registered network.

In accordance with an aspect of the present disclosure, an electronic device is provided that includes a removable SIM, a secure memory configured to store at least one profile, a processor configured to select at least one of the removable SIM and the secure memory, to be used for packet data transmission and reception of the electronic device, in response to an occurrence of a data service change event, and a communication interface configured to perform network registration through the selected at least one of the removable SIM and the secure memory and to perform the packet data transmission and reception through the registered network.

In accordance with another aspect of the present disclosure, a method of an electronic device including a removable SIM and a secure memory is provided. The method includes detecting an occurrence of a data service change event, selecting at least one of the removable SIM and the secure memory, to be used for packet data transmission and reception, in response to the occurrence of the data service change event, performing network registration through the selected at least one of the removable SIM and the secure memory, and performing the packet data transmission and reception through the registered network

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numbers may be used to depict the same or similar elements, features, and structures.

DETAILED DESCRIPTION

Figure 1:
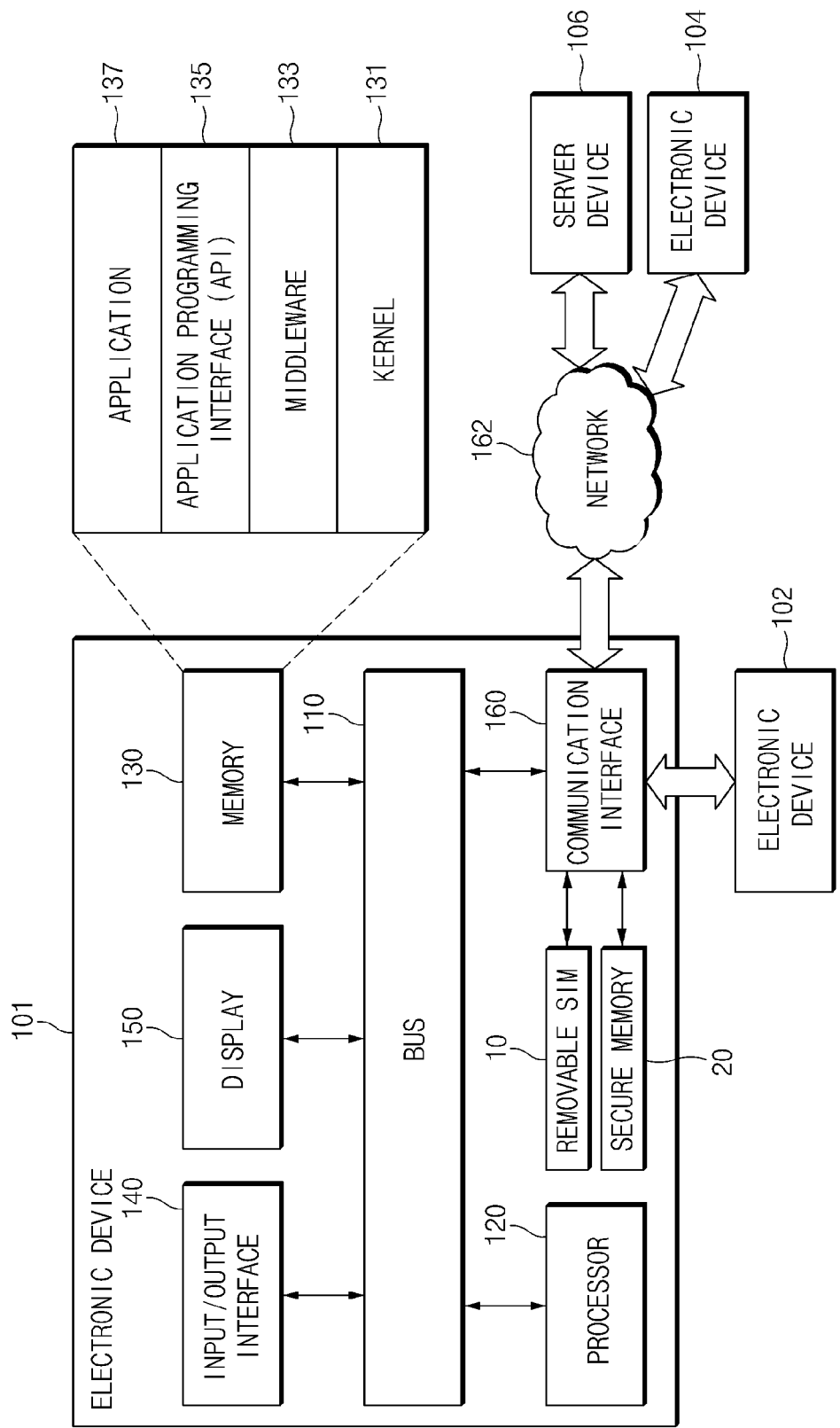
FIG. 1 illustrates an electronic device according to an embodiment of the present disclosure.

Various embodiments of the present disclosure are described below with reference to accompanying drawings. Those of ordinary skill in the art will recognize that modification, equivalent, and/or alternative on the various embodiments described herein can be variously made without departing from the scope and spirit of the present disclosure.

Terms used to describe specified embodiments of the present disclosure are not intended to limit the scope of the present disclosure. The terms of a singular form may include plural forms unless otherwise specified. Additionally, unless otherwise defined herein, all the terms used herein, which include technical or scientific terms, may have the same meanings that are generally understood by a person skilled in the art.

It will be further understood that terms, which are defined in a dictionary and commonly used, should also be interpreted as customary in the relevant related art and not in an idealized or overly formal way, unless expressly so defined herein. In some cases, even if terms are defined in the specification, they are not to be interpreted to exclude other embodiments of the present disclosure.

Herein, the expressions "have", "may have", "include", "comprise", "may include", and "may comprise" indicate the existence of corresponding features (e.g., elements such as numeric values, functions, operations, or components) but do not exclude presence of additional features.

In addition, the expressions "A or B", "at least one of A or/and B", "one or more of A or/and B", and the like include any and all combinations of one or more of the associated listed items. For example, the term "A or B", "at least one of A and B", or "at least one of A or B" may refer to (1) where at least one A is included, (2) where at least one B is included, or (3) where both of at least one A and at least one B are included.

The terms, such as "first", "second", etc., may refer to various elements of various embodiments of the present disclosure, but do not limit the elements. For example, such terms do not limit the order and/or priority of the elements.

Further, such terms may be used to distinguish one element from another element. For example, "a first user device" and "a second user device" indicate different user devices. A first element may be referred to as a second element, and similarly, a second element may be referred to as a first element.

When an element (e.g., a first element) is referred to as being "(operatively or communicatively) coupled with/to" or "connected to" another element (e.g., a second element), the first element may be directly coupled with/to or connected to the second element or an intervening element (e.g., a third element) may be present therebetween. However, when the first element is "directly coupled with/to" or "directly connected to" the second element, no intervening element (e.g., a third element) may be disposed therebetween.

Herein, the expression "configured to" may be interpreted as "suitable for", "having the capacity to", "designed to", "adapted to", "made to", or "capable of". The term "configured to" does not only mean "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) that may perform corresponding operations by executing one or more software programs which are stored in a memory device.

Herein, an electronic device may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, a wearable device (e.g., a head-mounted-device (HMD), such as electronic glasses), electronic apparel, an electronic bracelet, an electronic necklace, an electronic appcessory, an electronic tattoo, a smart mirror, a smart band, a smart watch, etc.

Additionally, an electronic device may be a smart home appliance, such as a television (TV), a digital versatile disc (DVD) player, an audio device, a refrigerator, an air conditioner, a cleaner, an oven, a microwave oven, a washing machine, an air cleaner, a set-top box, a TV box (e.g., Samsung HomeSync®, Apple TV⁷®, or Google TV®), a game console (e.g., Xbox® and PlayStation®), an electronic dictionary, an electronic key, a camcorder, an electronic picture frame, etc.

Further, an electronic devices may be a medical device (e.g., a portable medical measurement device, such as a blood glucose monitoring device, a heartbeat measuring device, a blood pressure measuring device, a body temperature measuring device, etc, a magnetic resonance angiography (MRA) device, a magnetic resonance imaging (MRI) device, a computed tomography (CT) device, a scanner, and an ultrasonic device), a navigation device, a global positioning system (GPS) receiver, an event data recorder (EDR), a flight data recorder (FDR), a vehicle infotainment device, an electronic equipment for a vessel (e.g., navigation systems and gyrocompasses), avionics equipment, a security device, a head unit for a vehicle, an industrial or home robot, an automatic teller machine (ATM), a points of sale (POS) device, or an internet of things (IoT) device (e.g., a light bulb, a sensor, an electric or gas meter, a sprinkler device, a fire alarm, a thermostat, a street lamp, a toaster, exercise equipment, a hot water tank, a heater, a boiler, etc,).

An electronic device may also include furniture or buildings/structures, electronic boards, electronic signature receiving devices, projectors, or various measuring instruments (e.g., water meters, electricity meters, gas meters, or wave meters, etc.

An electronic device may be a flexible electronic device.

Additionally, an electronic device may be one or more combinations of the above-mentioned devices.

Also, an electronic device is not limited to the above-mentioned examples, and may include new electronic devices according to new technology development.

Herein, the term "user" may refer to a person who uses an electronic device or may refer to a device (e.g., an artificial intelligence electronic device) that uses an electronic device.

FIG. 1 illustrates an electronic device according to various embodiments of the present disclosure.

Referring to FIG. 1, an electronic device 101 includes a removable SIM 10, a secure memory 20, a bus 110, a processor 120, a memory 130, an input/output (I/O) interface 140, a display 150, and a communication interface 160. The electronic device 101 may also omit at least one of the above-described components or may further include other component(s).

The removable SIM 10 may be attached or detached to or from the electronic device 101 through a socket implemented on the electronic device 101. The removable SIM 10 may include a SIM card, a USIM card, a UICC card, etc. The removable SIM 100 may provide subscriber authentication, charging, security function, etc., on the electronic device 101 performing mobile communication, and may include corresponding mobile network operator (MNO) information, roaming information, authentication information, subscriber information, etc.

The secure memory 20 may include an independent operating system (OS) and may store and delete at least one profile. A profile (e.g., an MNO profile) may be a subscriber identifier module that is downloaded to or deleted from the secure memory 20 and may include operator information, roaming information, authentication information (e.g., IMSI), subscriber information (e.g., an ICCID), etc. The secure memory 20 may download a profile in the OTA manner. One profile may correspond to a removable SIM card. The secure memory 20 may store a plurality of profiles, and the electronic device 101 may use different network services, which a plurality of operators provide, using the plurality of profiles installed on the secure memory 20.

The secure memory 20 may be mounted on the electronic device 101 in the form of a chip when the electronic device 101 is manufactured, may not be removed by a user, and may include an independent OS. The secure memory 20 may include various authentication information (e.g., a private key) associated with download, installation, and management of the profile, a public key, a certificate, a keyset for updating the certificate, etc., and may provide a secure OTA channel or a network authentication algorithm. The secure memory 20 may include an eUICC, an embedded secure element (eSE), a micro secure digital (SD), a trust zone, etc.

A standard platform, an internal structure and connected units of the secure memory 20 may vary according to each embodiment provided in the disclosure. For example, if implemented with the eUICC, the secure memory 20 may be connected with a communication processor (CP) (e.g., the communication interface 160), and thus a global platform according to the eUICC standard may be applied to the secure memory 20.

Alternatively, if implemented with the eSE, the secure memory 20 may be connected with a near field communication (NFC) module, and thus a global platform according to the eSE standard may be applied to the secure memory 20.

Alternatively, if implemented with the trust zone, the secure memory 20 may correspond to a separate secure area (e.g., a secure world) separated from a normal area (e.g., a normal world) with respect to one physical processor (or a processor core) and may have a central processing unit, a register, an address space, a memory, a device, an operating system, etc., which are separated from the normal area. However, the scope and spirit of the present disclosure may not be limited thereto. For example, the secure memory 20 may include all secure areas capable of storing and deleting at least one profile.

The bus 110 may interconnect the above-described components 110 to 160 and may be a circuit for conveying communications (e.g., a control message and/or data) among the above-described components.

The processor 120 may include one or more of a central processing unit (CPU), an application processor (AP), or a CP. The processor 120 may perform data processing or an operation associated with control or communication of at least one other component(s) of the electronic device 101.

The processor 120 may select at least one component, which is to be used for packet data transmission and reception of the electronic device 101, from among the removable SIM 10 and the secure memory 20, in response to an occurrence of a data service change event. For example, the data service change event may occur when a network connected through the removable SIM 10 is changed to a roaming network, when the electronic device 101 is out of a network service area of the removable SIM 10, or when the electronic device 101 is out of a network service area of a profile of the secure memory 20.

The processor 120 may make use of at least one of a data service using the removable SIM 10 or a data service using at least one profile usable through the secure memory 20.

The processor 120 may interrupt or block a PS network connection through the secure memory 20 and may provide a voice service and a data service using a network (including a PS network and a circuit-switched (CS) network) registered through the removable SIM 10.

The processor 120 may interrupt or block the PS network connection while maintaining the CS network connection through the removable SIM 10. The processor 120 may provide the voice service through the removable SIM 10 and the data service using a network registered through the secure memory 20.

The processor 120 may simultaneously provide the data service using the removable SIM 10 and the data service using the secure memory 20. The processor 120 may maintain the CS network connection using the removable SIM 10. For example, the processor 120 may allow the data service to be provided using the secure memory 20 with respect to some specific applications and may allow the data service to be provided using the removable SIM 10 with respect to the others. For example, the electronic device 101 may be configured to use the data service through the removable SIM 10 with respect to general applications that use relatively small amounts of data and to use the data service through the secure memory 20, in which a profile dedicated to the data service is stored, with respect to applications which use relatively large amounts of data.

If the secure memory 20 is selected, the processor 120 may select a profile to be used for the electronic device 101 to transmit and receive packet data, from among at least one profile usable through the secure memory 20. The at least one profile usable through the secure memory 20 may include at least one profile stored in the secure memory 20 or at least one profile capable of being downloaded on the secure memory 20.

The memory 130 may store information (e.g., operator information, information associated with a data service plan of a profile, etc.) about at least one profile usable through the secure memory 20. For example, the memory 130 may provide information associated with the profile in the form of database, which may be updated through the communication interface 160.

The memory 130 may include a volatile and/or nonvolatile memory. The memory 130 may store instructions or data associated with at least one other component(s) of the electronic device 101. The memory 130 may store software and/or a program. For example, the program includes a kernel 131, a middleware 133, an application programming interface (API) 135, and an application program (or an application) 137. At least a portion of the kernel 131, the middleware 133, or the API 135 may be referred to as an "operating system (OS)".

The kernel 131 may control or manage system resources (e.g., the bus 110, the processor 120, the memory 130, etc.) that are used to execute operations or functions of other programs (e.g., the middleware 133, the API 135, and the application program 137). Further, the kernel 131 may provide an interface that allows the middleware 133, the API 135, or the application program 137 to access discrete components of the electronic device 101, e.g., to control or manage system resources.

The middleware 133 may perform a mediation role such that the API 135 or the application program 137 communicates with the kernel 131 to exchange data.

Further, the middleware 133 may process task requests received from the application program 137 according to a priority. For example, the middleware 133 may assign the priority for using a system resource (e.g., the bus 110, the processor 120, the memory 130, or the like) of the electronic device 101 to at least one of the application program 137.

For example, the middleware 133 may process the one or more task requests according to the priority assigned to the at least one, which makes it possible to perform scheduling or load balancing on the one or more task requests.

The API 135 may be an interface through which the application program 137 controls a function provided by the kernel 131 or the middleware 133, and may include, for example, at least one interface or function (e.g., an instruction) for a file control, a window control, image processing, a character control, or the like.

The I/O interface 140 may transmit an instruction or data, input from a user or another external device, to other component(s) of the electronic device 101. Further, the I/O interface 140 may output an instruction or data, received from other component(s) of the electronic device 101, to a user or another external device.

The input/output interface 140 may receive a user input which is associated with a setting about the data service or selection of a component and/or a profile. For example, a user may set whether to use an additional data service capable of using the data service through the secure memory 20, may select at least one, which the user will use, from among operators in a list or data service plans in a list displayed through the display 150, or may set whether to use the data service through the secure memory 20 for an application.

The display 150 may include a liquid crystal display (LCD), a light-emitting diode (LED) display, an organic LED (OLED) display, a microelectromechanical systems (MEMS) display, or an electronic paper display. The display 150 may display various content (e.g., a text, an image, a video, an icon, a symbol, etc.) to a user. The display 150 may include a touch screen and may receive a touch, gesture, proximity, or hovering input using an electronic pen or a portion of a user's body.

The display 150 may display a user interface screen including a setting about the data service or information (e.g., an operator list, a data service plan list, and the like) about a profile usable on the secure memory 20.

The communication interface 160 may establish communication between the electronic device 101 and an external electronic device (e.g., an electronic device 102, an electronic device 104, or a server 106). For example, the communication interface 160 may be connected to a network 162 through wireless communication or wired communication to communicate with the external electronic device 104 or the server 106.

Examples of the wireless communication may include Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), or Global System for Mobile Communications (GSM) as cellular communication protocol. Further, the wireless communication may include a local area network, e.g., Wireless Fidelity (Wi-Fi), Bluetooth, NFC, global positioning system (GPS), etc.

Examples of the wired communication may include a universal serial bus (USB), a high definition multimedia interface (HDMI), a recommended standard-132 (RS-132), or a plain old telephone service (POTS).

The network 162 may include at least one of telecommunications networks, for example, a computer network (e.g., local area network (LAN) or wide area network (WAN)), an Internet, or a telephone network.

The processor 160 may provide a packet data service using at least one SIM of the secure memory 20 or the removable SIM 10.

The communication interface 160 may perform network registration using a component, selected by the processor 120, from among the removable SIM 10 and the secure memory 20 and may transmit and receive packet data through the registered network. For example, if at least one profile stored in the secure memory 20 is selected, the communication interface 160 may transmit and receive the packet data through a network that is registered through the selected profile of the secure memory 20.

The communication interface 160 may stop or block a network connection for a data service associated with other component(s) except a network connection for a data service associated with the selected component.

While providing the data service using the secure memory 20, the communication interface 160 may maintain a network connection of at least one of the CS network or an IP multimedia subsystem (IMS) network through the removable SIM 10. Thus, functions of the electronic device 101, which are performed using a phone number (e.g., an MSISDN) or a user public number (e.g., Public User Identity (PUID)) assigned to the removable SIM 10, such as a call, a multimedia message service (MMS), a short message service (SMS), etc., may be continuously provided regardless of selection of a component for use in the packet data service.

The communication interface 160 may download the selected profile on the secure memory 20, if the secure memory 20 does not include the selected profile. For example, the communication interface 160 may download the selected profile on the secure memory 20 through a network that is registered using the removable SIM 10 or a profile (e.g., a default profile) stored in the secure memory 20. The electronic device 101 may select a specific profile and may request download of the selected profile from a profile transmission server providing the selected profile. Alternatively, the communication interface 160 may send a message, which includes network information (e.g., a mobile country code (MCC), a mobile network code (MNC), latitude, longitude, etc.) of the electronic device 101 to a server of a data service operator. For example, network information may be provided together with the message in requesting download of any profile of the electronic device 101, and the message may include an SMS, an MMS, an HTTP request, etc.

The server of the data service operator may send a push (e.g., a wireless application protocol (WAP) push) to the electronic device 101, after selecting a profile for the electronic device 101, in response to the message from the electronic device 101. The electronic device 101 may connect to the server of the data service operator or the profile transmission server in response to the push, and thus, the electronic device 101 may download the selected profile on the secure memory 20 from the connected server. For example, the profile transmission server may be a profile management server (e.g., subscription manager-secure routing (SM-SR)) that of verifies and manages installation, deletion, enablement, disablement, etc., of a profile in the secure memory 20. The server of the data service operator may be a server of an operator, which provides a network service of the removable SIM 10, or a server of another operator.

The memory 160 may receive information (e.g., operator information, a data service plan of a profile, etc.) about the data service of at least one profile usable through the secure memory 20. Accordingly, the processor 120 may select a profile for transmission and reception of data packet based on the received information.

The communication interface 160 may interrupt or block a network connection through the secure memory 20 if the removable SIM 10 is detached from the electronic device 101.

If the communication interface 160 has only one radio frequency (RF) module, it may be possible to transmit and receive packet data through one component selected from the receive SIM 10 electrically connected with the communication interface 160 and the secure memory 20 (e.g., dual standby single active).

If the communication interface 160 has a plurality of RF modules, it may be possible to transmit and receive packet data using, simultaneously, at least one component and/or at least one profile selected from the receive SIM 10 electrically connected with the communication interface 160 and the secure memory 20 (e.g., dual standby dual active).

Each of the electronic devices 102 and 104 may be a device of which the type is different from or the same as that of the electronic device 101. The server 106 may include a group of one or more servers. All or a part of operations that the electronic device 101 will perform may be executed by another or plural electronic devices 102 and 104, and the server 106.

The electronic device 101 may perform only some of the functions or the services internally, and may request at least a portion of a function associated with the electronic device 101 from another device. The other electronic device may execute the requested function or additional function and may transmit the execution result to the electronic device 101. The electronic device 101 may provide the requested function or service using the received result or may provide the requested function or service by additionally processing the received result. For example, cloud computing, distributed computing, or client-server computing may be used.

As described above, the electronic device 101 may provide an optimal data service, which is selected according to a situation, such as a change of a network state, movement of the electronic device 101, a setting about a data service, or the like, from among at least one data service usable through the removable SIM 10 or the secure memory 20.

Figure 2:
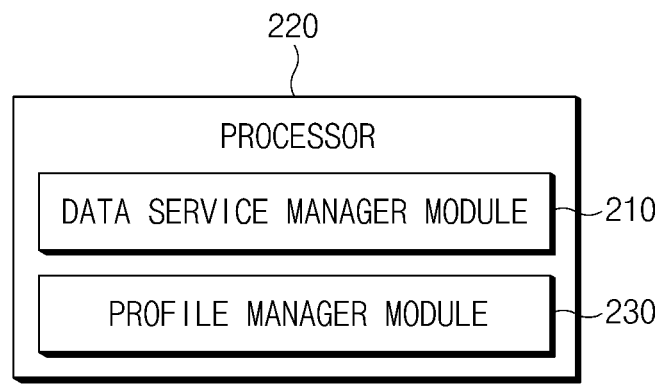
FIG. 2 illustrates a processor of an electronic device according to an embodiment of the present disclosure.

FIG. 2 illustrates a processor of an electronic device according to an embodiment of the present disclosure. For example, the processor 220 illustrated in FIG. 2 may be substituted for the processor 120 illustrated in FIG. 1.

Referring to FIG. 2, the processor 220 includes a data service manager module 210 and a profile manager module 230. Herein, the data service manager module 210 and the profile manager module 230 are implemented by the processor 220 using instructions or program codes stored in a memory, e.g., the memory 130.

The data service manager module 210 may select at least one component, which is to be used for packet data transmission and reception of the electronic device, from among a removable SIM and a secure memory in response to an occurrence of a data service change event. If the secure memory is selected, the data service manager module 210 may select a profile, which is to be used for the electronic device to transmit and receive packet data, from among at least one profile usable through the secure memory.

The data service manager module 210 may select at least one component and/or profile for use in transmitting and receiving packet data, based on information about a data service stored in the memory or information about a data service received from a communication interface. For example, information associated with the data service may include setting information (e.g., whether to subscribe in a supplementary data service through the secure memory, whether to set the supplementary data service, and the like) associated with the data service, operator information of at least one profile usable on the secure memory, information associated with a data service plan, or the like. The data service plan may indicate a service type of a packet data transmission service that a mobile communication operator (hereinafter referred to as "operator") provides through a network of the operator. A data transmission charge and the like which are determined according to an operator, a connected network, a data transfer rate, and data throughput may change according to the data service plan.

The data service manager module 210 may select at least one component and/or profile for use in transmitting and receiving packet data, based on at least one of a type of an issued data service change event, a location of the electronic device, a network state, a user preference, a user input, or an application kind. For example, the data service manager module 210 may provide a data service through a network registered through the secure memory, with respect to at least a specific part of applications using the data service. A network in which packet data is transmitted for an application may be determined through a setting of a route table by the data service manager module 210. This will be described in more detail below with reference to Table 1.

If the electronic device is out of a network service area of an operator of the removable SIM, the data service manager module 210 may select the secure memory and may select a profile of the secure memory to be used in transmitting and receiving packet data. If a profile of the secure memory is selected, the communication interface may perform network registration through the selected profile with a network connection through the removable SIM maintained.

After performing network registration through the selected profile of the secure memory, the communication interface may interrupt or block a connection with a PS network through the removable SIM, if a connection with the PS network through the removable SIM is not needed due to selection of a component to be used to transmit and receive packet data.

If the electronic device re-enters the network service area of the operator of the removable SIM, the data service manager module 210 may reselect the removable SIM, and the communication interface may perform the PS network registration through the removable SIM with a network connection through the secure memory maintained. The communication interface may interrupt or block network a connection through the secure memory after performing the network registration through the removable SIM.

If the electronic device is located within a home network of the removable SIM, a data service, which a home operator provides, may be more economical. Accordingly, the electronic device may connect to a network using the removable SIM and may interrupt or block a network connection through the secure memory.

If the electronic device is out of the home network of the removable SIM, for example, when the electronic device does not search for a public land mobile network (PLMN) having the same mobile country code (MCC) and mobile network code (MNC) as a PLMN of the home network, the electronic device may be able to use a data service through the secure memory economically compared with a data service by roaming of the removable SIM. Therefore, after performing PS network registration using the secure memory, the electronic device may interrupt or block a connection with a packet network through the removable SIM. When the electronic device maintains at least one of a CS network or an IMS network through the removable SIM, the electronic device may use a communication service, such as SMS, MMS, etc., using the removable SIM, even while using the data service through the secure memory.

When the electronic device is able to use Wi-Fi, the data service manager module 210 may interrupt or block a connection with the PS network through the removable SIM and the secure memory. Alternatively, when a request arises from an application needing a data service such as an MMS at a Wi-Fi state, the data service manager module 210 may provide a data service using the removable SIM.

Based on a state of the electronic device, the profile manager module 230 may control the on/off of power of the secure memory or may control a network registration about the removable SIM or the secure memory.

The profile manager module 230 may manage a list of profiles currently usable on the secure memory. For example, the profile manager module 230 may receive a profile list from a subscription server. The profile manager module 230 may transmit a profile switch request to the subscription server.

The profile manager module 230 may manage download/delete of a profile on the secure memory and enable/disable of a profile stored in the secure memory. For example, the profile manager module 230 may enable the selected profile if the selected profile is included in the secure memory, but is disabled. If a profile selected by the data service manager module 210 is not included in the secure memory, the profile manager module 230 may download the selected profile through the communication interface and may enable the downloaded profile.

If a location of the electronic device is out of a network service area of an operator of the removable SIM, the data service manager module 210 may provide notification that a data service through the secure memory is possible, e.g., through a display, and may display information (e.g., information of an operator providing a network service at a current location, a data service plan which a corresponding operator provides, or the like) about a data service, which the electronic device is able to use, to a user.

If the electronic device 101 is out of a network service area of an operator of the removable SIM, the profile manager module 230 may automatically download or enable a profile, which provides a data service usable at a location of the electronic device, based on a setting about the data service and may register the enabled profile at a PS network.

Table 1 below represents a route table that may be used to determine a network transmitting packet data at the electronic device.

include mapping information indicating whether to transmit a specific Internet protocol (IP) packet through any network.

Referring to Table 1, a network destination may indicate an address for which an IP packet (packet data) heads. For example, the network destination may be a server address which a corresponding application uses. In the route table, a network destination for which an IP packet heads may be set for an application.

An address of a network connected for an IP packet to head for an address of a network destination may be set at an interface. Based on a setting of each application, the processor 220 may set an interface address of the route table to have a specific address and may connect the IP packet to a network having the specific address.

For example, if the route table does not include an address of a network destination of an IP packet, the processor 220 may set the network destination to have a default gateway address of (0,0,0,0), and the communication interface may transmit the IP packet to a specific network of a corresponding network destination.

For example, for an IP packet of the route table, of which the interface is not determined, the processor 220 may control such that the IP packet is transmitted through a PS network connected through the removable SIM.

As such, to transmit an IP packet, which a specific application transmits, to a specific network, the processor 220 may set a network destination to have a server address which the specific application uses and may add a new route entry, in which a network assigned to a corresponding IP packet is set as an interface, to the route table, thereby making it possible to transmit packet data through different networks for an application.

Figure 3:
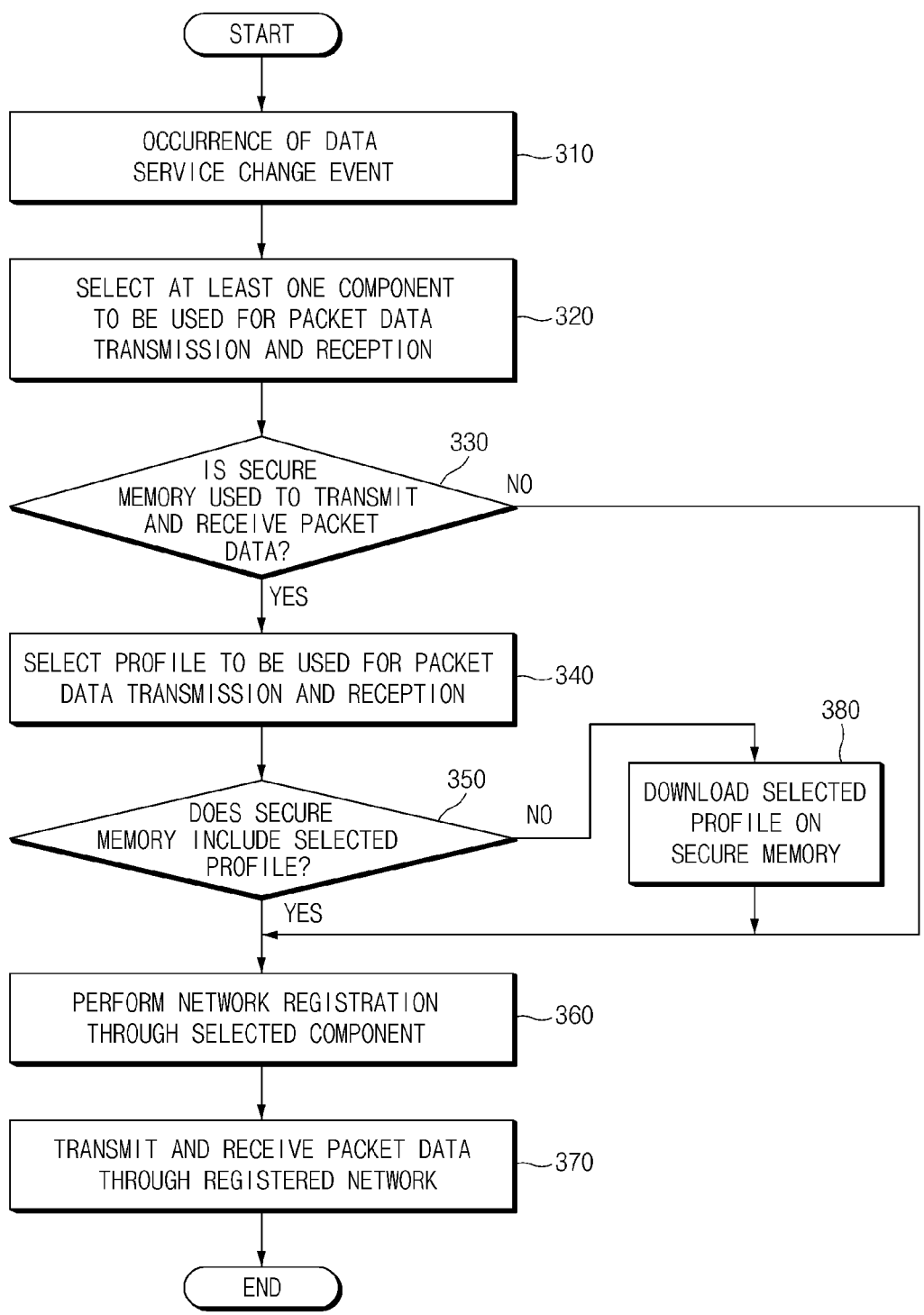
FIG. 3 is a flow chart illustrating a method for providing a data service, according to an embodiment of the present disclosure.

FIG. 3 is a flow chart illustrating a method for providing a data service, according to an embodiment of the present disclosure. For example, the method illustrated in FIG. 3 may include operations performed by the electronic device 101 as illustrated in FIG. 1.

Referring to FIG. 3, in step 310, the electronic device, e.g., the processor therein, determines an occurrence of a data service change event at the electronic device. For example, the data service change event may include at least one of a state change of a network connected through a removable SIM or a secure memory, that the electronic device is out of a network service area of a profile of the removable SIM or the secure memory, or a change of a setting about a data service. A state change of a network connected through the removable SIM may include a network connected through the removable SIM being changed

TABLE 1

| Network Destination | Netmask | Gateway | Interface | Metric |
|---|---|---|---|---|
| 0.0.0.0 | 0.0.0.0 | 192.168.0.1 | 192.168.0.100 | 10 |
| 127.0.0.0 | 255.0.0.0 | 127.0.0.1 | 127.0.0.1 | 1 |
| 192.168.0.0 | 255.255.255.0 | 192.168.0.100 | 192.168.0.100 | 10 |
| 192.168.0.100 | 255.255.255.255 | 127.0.0.1 | 127.0.0.1 | 10 |
| 192.168.0.1 | 255.255.255.255 | 192.168.0.100 | 192.168.0.100 | 10 |

The electronic device may set whether to use a supplementary data service through the secure memory, for an application. The processor 220 may allow only a specific application to use a data service using the secure memory. If an application that will use a data service using the secure memory is specified on the electronic device, the processor 220 may set a route table on an operating system of the electronic device in the form of Table 1. The route table may to a roaming network. Further, a change of a setting about the data service may include the use of the data service through the secure memory being selected through a user interface.

In step 320, the electronic device selects at least one component, which is to be used for packet data transmission and reception, from among the removable SIM and the secure memory, in response to the occurrence of the data service change event. For example, a data service manager module 210 as illustrated in FIG. 2 may select at least one component and/or profile for use in transmission and reception of packet data, based on at least one of a type of an issued data service change event, a location of the electronic device, a network state, a user preference, a user input, or a type of application.

In step 330, the electronic device determines whether to use the secure memory to transmit and receive the packet data.

If the electronic device determines to use the secure memory to transmit and receive the packet data in step 330, the electronic device selects a profile to be used to transmit and receive the packet data from among at least one profile usable on the secure memory in step 340. The at least one profile usable on the secure memory may include a profile stored in the secure memory or a profile capable of being downloaded to the secure memory. The electronic device may select a profile fit to a particular situation, e.g., based on location information of the electronic device and a setting about the data service.

For example, the electronic device may select a profile from database stored in the electronic device or may download a profile through an OTA channel by connecting to a server or transmitting network information to a server through a message.

In step 350, electronic device determines whether the secure memory includes the selected profile.

If the electronic device determines that the secure memory does include the selected profile in step 350, the communication interface 160 may download the selected profile on the secure memory 20.

If the electronic device determines that the secure memory includes the selected profile in step 350, if the electronic device determines not to use the secure memory to transmit and receive the packet data in step 330, or after downloading the selected profile in step 380, the electronic device performs network registration through a selected component in step 360.

If the selected profile is currently disabled, the electronic device may enable the selected profile and perform network registration through the profile.

In step 370, the electronic device transmits and receives packet data through the registered profile.

Figure 4:
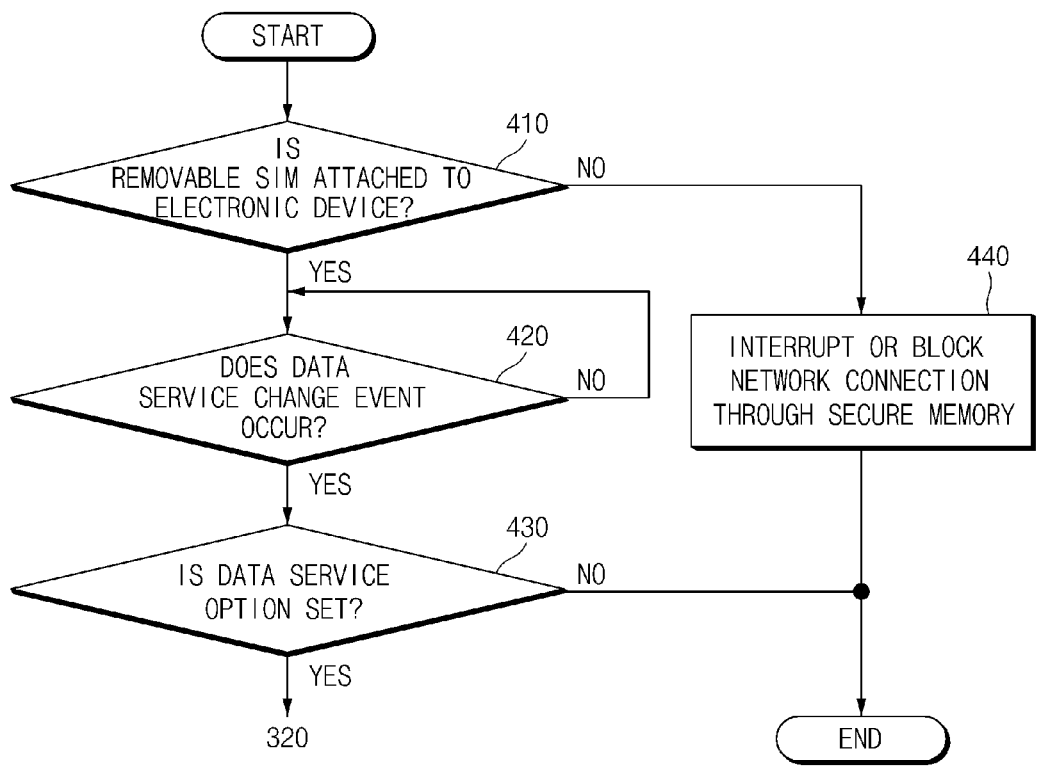
FIG. 4 is a flow chart illustrating a method for using a data service when a removable SIM is detached from an electronic device, according to an embodiment of the present disclosure.

Even while transmitting and receiving packet data using a profile stored in the secure memory, the electronic device, e.g. a communication interface thereof, may maintain network connection of at least one of the CS network or an IMS network using the removable SIM. Compared with a dual SIM maintaining two phone numbers (circuits), the electronic device may provide an optimized data service while maintaining one phone number (circuit). FIG. 4 is a flow chart illustrating a method for using a data service when a removable SIM is detached from an electronic device, according to an embodiment of the present disclosure. For example, the method illustrated in FIG. 4 may be performed in step 310 of FIG. 3.

Referring to FIG. 4, the electronic device determines whether a removable SIM is attached to the electronic device in step 410.

If the electronic device determines that the removable SIM is attached to the electronic device in step 410, the electronic device determines whether a data service change event occurs in step 420. For example, the data service change event may include at least one of a state change of a network connected through the removable SIM or a secure memory, that the electronic device is out of a network service area of a profile of the removable SIM or the secure memory, or a change of a setting about a data service.

When the electronic device determines that the data service change event occurs in step 420, the electronic device determines whether a data service option is set in step 430. The data service option may indicate a supplementary data service that is able to use a data service through the secure memory, independently of a data service through the removable SIM.

If the electronic device determines that the data service option is set in step 430, the electronic device selects a component to be used, e.g., may perform step 320 of FIG. 3; otherwise, the electronic device terminates the method.

If the electronic device determines that the removable SIM is not attached to the electronic device in step 410, the electronic device interrupts or blocks the network connection through the secure memory in step 440. For example, if the removable SIM is detached from the electronic device, the electronic device may operate as no SIM exists, even though a profile stored in the secure memory exists.

Figure 5:
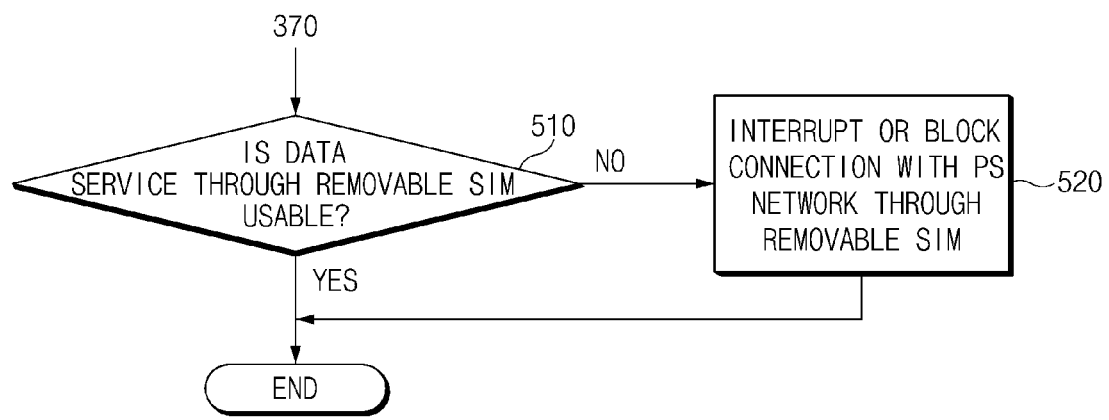
FIG. 5 is a flow chart illustrating a method for selecting whether to maintain connection with a packet switched (PS) network through a removable SIM in using a data service through a secure memory at an electronic device, according to an embodiment of the present disclosure.

FIG. 5 is a flow chart illustrating a method for selecting whether to maintain a connection with a PS network through a removable SIM in using a data service through a secure memory at an electronic device, according to an embodiment of the present disclosure. For example, the method illustrated in FIG. 5 may be performed after step 370 of FIG. 3.

According to an embodiment of the present disclosure, the electronic device, e.g., a processor thereof, may determine whether to interrupt or block a connection with the PS network through the removable SIM, based on a setting about a data service option.

Referring to FIG. 5, in step 510, the electronic device determines whether to use a data service through the removable SIM of the electronic device in using a data service through the secure memory.

If the electronic device uses a data service through the removable SIM, the electronic device may terminate a process about a data service change while maintaining the connection with the PS network through the removable SIM.

If the electronic device determines to use a data service through the removable SIM of the electronic device in step 520, the electronic device interrupts or blocks a connection with the PS network through the secure memory. For example, the electronic device may block a data service through the removable SIM and uses a data service through the secure memory. Even though the connection with the PS network through the removable SIM is blocked or interrupted, the electronic device may maintain network connection of at least one of a CS network or an IMP network through the removable SIM.

Figure 6:
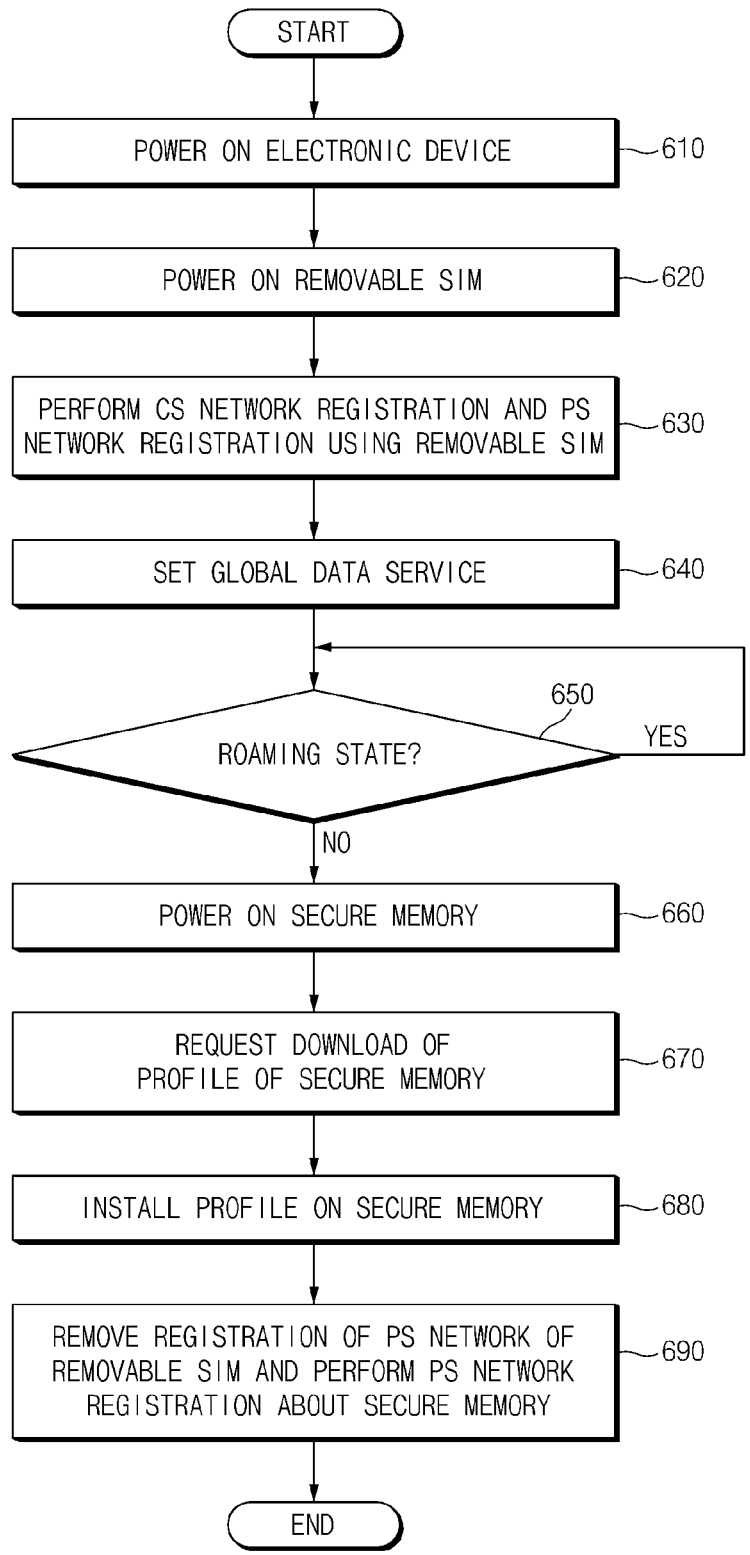
FIG. 6 is a flow chart illustrating an operation of an electronic device when the electronic device has a roaming state with a global data service set, according to an embodiment of the present disclosure.

FIG. 6 is a flow chart illustrating a method of an electronic device during a roaming state with a global data service set, according to an embodiment of the present disclosure.

Referring to FIG. 6, in step 610, the electronic device is be powered on.

In step 620, a removable SIM of the electronic device is powered on. Even though the electronic device and the removable SIM are powered on, a secure memory of the electronic device may maintain a power-off state.

In step 630, the electronic device performs CS network registration and PS network registration using the removable SIM.

In step 640, the global data service is set at the electronic device. For example, the electronic device receives a user input for setting the global data service through an input/output interface.

In step 650, the electronic device determines whether the electronic device is in a roaming state (e.g., if the electronic device is out of a home network of the removable SIM), based on network information.

If the electronic device is in a roaming state in step 650, the electronic device powers on the secure memory in step 660.

In step 670, the electronic device requests a download of a profile of the secure memory from a server. For example, a server that provides the download of a profile may be a server of a data service operator or a profile transmission server.

According to an embodiment of the present disclosure, the electronic device may transmit information of a peripheral network found through the removable SIM or location information of the electronic device in requesting the download of the profile from the server.

When the electronic device requests the download of the profile from the server of the data service operator, the electronic device may transmit an ID (e.g., an EID) of the secure memory installed on the electronic device or an ID (e.g., an SRID) of a profile transmission server from which the electronic device downloads a profile, together with the request.

In general, the server of the data service operator may previously know ID of the secure memory and an ID of the profile transmission server with regard to the electronic device, but it may not have information about the electronic device purchased on the open market. In this case, the electronic device may transmit an ID of the profile transmission server or an ID of the secure memory when requesting a download of a profile from the server of the data service operator.

After requesting download of a profile from the server of the data service operator, the electronic device may receive a transmission request about an ID of the secure memory or an ID of the profile transmission server from the server of the data service operator and may transmit the ID of the secure memory or the ID of the profile transmission server to the server of the data service operator. The ID of the secure memory or the ID of the profile transmission server may be information included in the secure memory or included in each profile of the secure memory, and the electronic device may receive the information from the secure memory through a profile manager module and may transmit the information to the server of the data service provider.

In step 680, the electronic device downloads and installs the profile from the server on the secure memory. The downloaded profile may be selected on the server. For example, the server may select a profile most appropriate to a current state of the electronic device, based on information (e.g., network information, location information, etc.) received from the electronic device. If a current location of the electronic device is a city and network information of a first network provider and a second network provider is obtained as result of searching for networks at the current location thereof, the electronic device may transmit location information of the city and the network information of the first network provider and the second network provider to the server with a request to download a profile. The server may receive the location information of the city and the network information of the first network provider and the second network provider from the electronic device and may select a profile, using a network of the first network provider or the second network provider, from among a plurality of profiles which the electronic device is able to use at the city, and the electronic device may download a profile selected by the server.

In step 690, if a profile installed on the secure memory is determined as being enabled, the electronic device may release registration about the PS network of the removable SIM (e.g., a PS network detach) and may perform PS network registration using the secure memory (e.g., a PS network attach). Even though the registration of the PS network of the removable SIM is released, registration of a CS network through the removable SIM may be continuously maintained.

According to an embodiment of the present disclosure, if the registration of the PS network through the removable SIM is released and the registration of the PS network through the secure memory is completed, the electronic device may update a route table of at least one application using a packet data service.

As described above, if a global data service of the electronic device is set and the electronic device is roaming, a packet data service through the removable SIM may be automatically changed to a packet data service through the secure memory.

Figure 7:
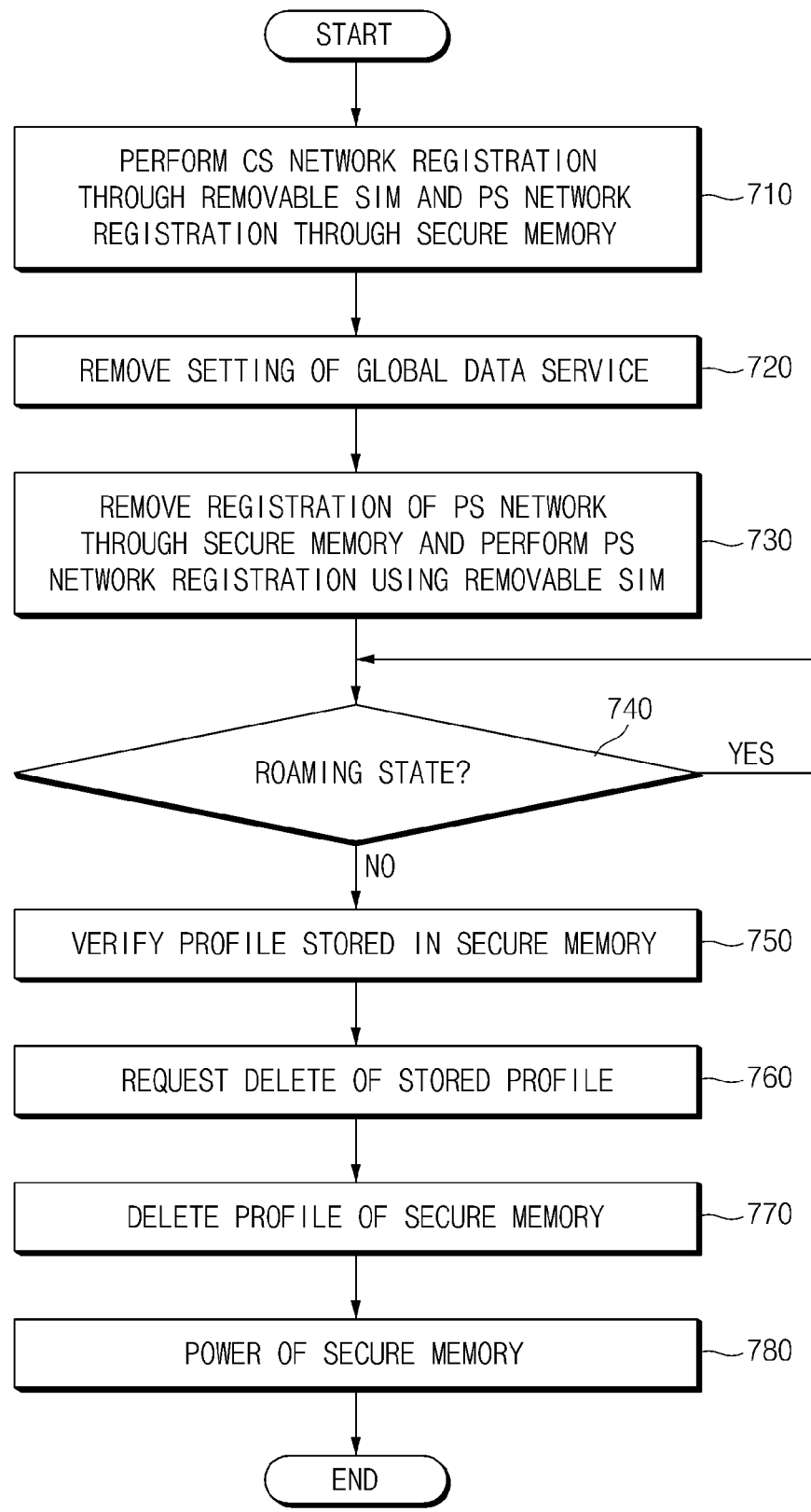
FIG. 7 is a flow chart illustrating an operation of an electronic device when a setting of a global data service of the electronic device is removed while a packet data service through a secure memory is being used, according to an embodiment of the present disclosure.

FIG. 7 is a flow chart illustrating a method of an electronic device when a setting of a global data service of the electronic device is removed while a packet data service through a secure memory is being used, according to an embodiment of the present disclosure.

Referring to FIG. 7, in step 710, when a global data service of the electronic device is set, the electronic device registers to a CS network through a removable SIM and at a PS network through the secure memory.

In step 720, a setting of the global data service of the electronic device is removed. For example, the electronic device receives a user input for releasing a setting of the global data service through an input/output interface.

In step 730, the electronic device removes the PS network registration through the secure memory and performs PS network registration using the removable SIM. CS network registration through the removable SIM may be maintained.

Accordingly, the electronic device may update a route table of at least one application using a packet data service.

In step 740, the electronic device determines when the electronic device enters a roaming state (e.g., when the electronic device is out of a home network of the removable SIM), based on network information. For example, the electronic device may determine whether to remain at a roaming state, periodically or non-periodically.

If the electronic device determines that it has entered a roaming state in step 740, the electronic device verifies a profile stored in the secure memory in step 750.

In step 760, the electronic device requests a server to delete at least one profile stored in the secure memory. For example, the server from which the electronic device requests deletion of a profile may be a server of a data service operator or a profile transmission server.

In step 770, the electronic device deletes a profile stored in the secure memory. For example, the electronic device deletes a profile stored in the secure memory in response to a delete request of a profile received from the server.

In step 780, the electronic device powers off the secure memory. For example, if the deletion of the profile stored in the secure memory is completed, the secure memory may be powered off.

According to an embodiment of the present disclosure, even though a setting of the global data service of the electronic device is removed, the global data service of the electronic device may be reset if the electronic device remains at a roaming state. Accordingly, if the electronic device is not out of the roaming state, the electronic device may maintain a profile installed on the secure memory without deletion.

If the global data service of the electronic device is reset, the electronic device may remove registration about the PS network through the removable SIM, may perform PS network registration using the secure memory, and may reuse a packet data service through the secure memory.

To perform PS network registration using a profile installed on the secure memory, the electronic device may verify a profile, which may use a corresponding network at a current location of the electronic device, from among profiles installed on the secure memory based on a network search result of the removable SIM and may request a server to enable a corresponding profile in the case where the corresponding profile is disabled. The electronic device may request download of a new profile from the server, if a profile that may use a corresponding network at a current location of the electronic device, from among profiles installed on the secure memory does not exist. The electronic device may transmit information of a found peripheral network with the request.

As described above, if a setting of the global data service of the electronic device is removed, a profile previously installed on the secure memory may be deleted. However, even though a setting of the global data service of the electronic device is removed, if the electronic device remains at a roaming state, the electronic device may defer deletion of the profile installed on the secure memory until the electronic device stops roaming.

Figure 8:
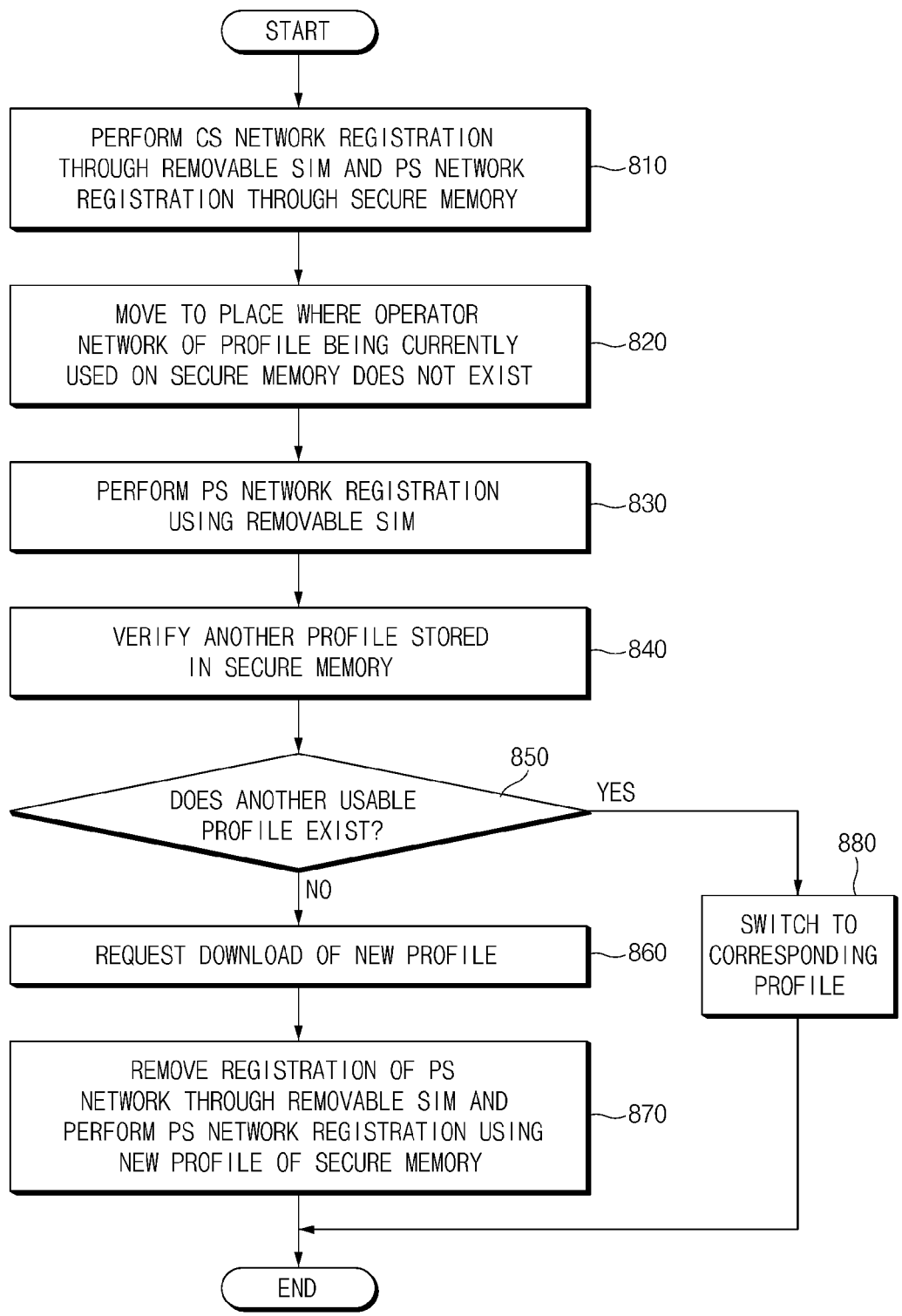
FIG. 8 is a flow chart illustrating an operation of an electronic device when the electronic device moves to a place where an operator network of a profile being currently used on a secure memory does not exist, according to an embodiment of the present disclosure.

FIG. 8 is a flow chart illustrating a method of an electronic device, when the electronic device moves to a place where an operator network of a profile being currently used on a secure memory does not exist, according to an embodiment of the present disclosure.

Referring to FIG. 8, in step 810, when a global data service of the electronic device is set, the electronic device registers at a CS network through a removable SIM and at a PS network through the secure memory.

In step 820, the electronic device moves to an area where an operator network of a profile being currently used on the secure memory does not exist, i.e., an area not supported by the operator network of the profile being currently used.

In step 830, the electronic device performs PS network registration using the removable SIM. If PS network registration is completed at the removable SIM, the electronic device may update a route table of at least one application using a packet data service and may allow an application, using a PS network of the secure memory, to use the PS network of the removable SIM.

In step 840, the electronic device verifies another profile stored in the secure memory.

In step 850, the electronic device determines if there is another profile that is usable at a current location. For example, the electronic device may obtain information (e.g., operator information) about a profile installed on the secure memory through a profile manager module and may determine whether a profile usable at a current location of the electronic device exists, based on the obtained information.

If the electronic device determines that there is not another profile that is usable at the current location in step 850, the electronic device requests a download of a new profile of the secure memory usable at the current location, from a server, in step 860. For example, the server may be a server of a data service operator or a profile transmission server. The electronic device may transmit information of a found peripheral network, location information of the electronic device, an EID, an SRID, etc., in requesting the download of the profile from the server.

In step 870, the electronic device downloads a profile from the server and installs the profile on the secure memory. If the installed profile is enabled, the electronic device may remove registration about the PS network of the removable SIM (e.g., a PS network detach) and may perform PS network registration using the secure memory (e.g., a PS network attach). Accordingly, the electronic device may provide a CS network-based service, such as voice call, video call, or a message service, using the removable SIM and may provide a packet data service using the secure memory.

If the electronic device determines that there is another profile that is usable at the current location in step 850, the electronic device may switch to the another profile in step 880. The electronic device may also request to disable of a previous profile and to enable of an available profile from the server.

Alternatively, according to an implementation method, the electronic device may enable or disable a profile installed on the secure memory internally, without requesting the disabling of a previous profile and the enabling of the available profile from the server.

Figure 9:
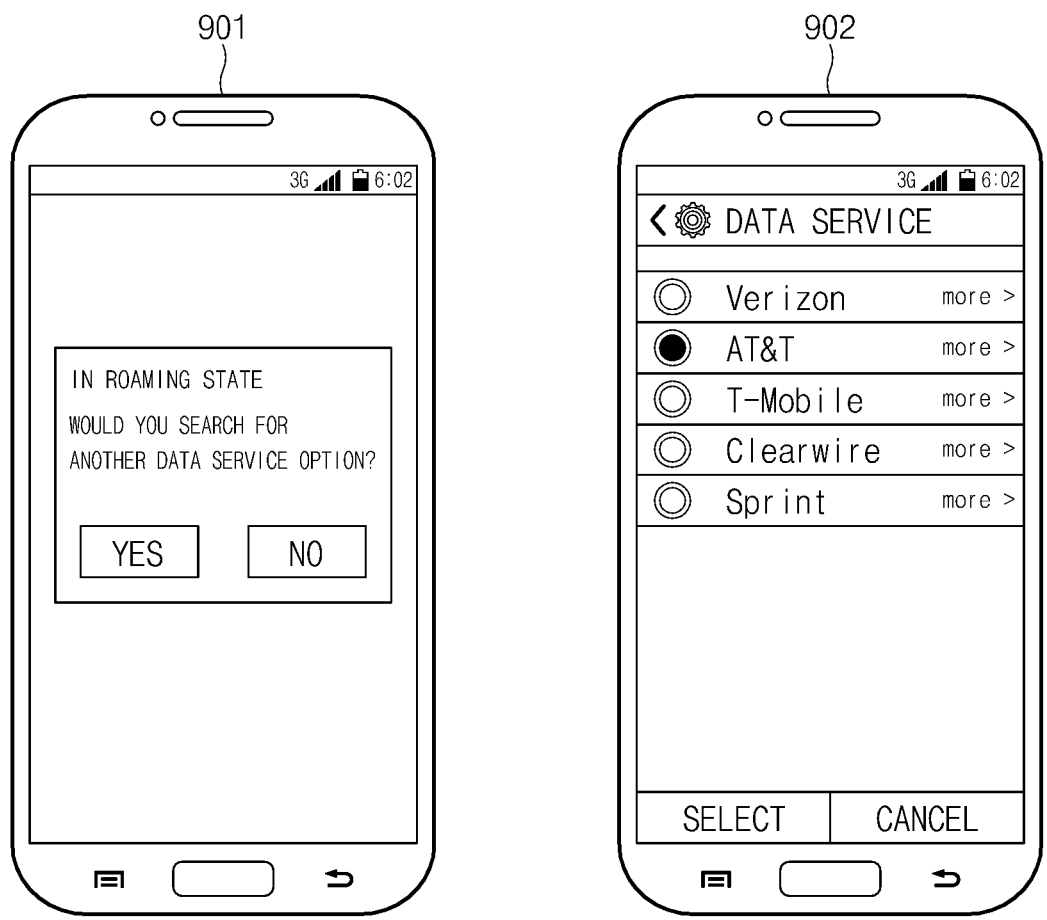
FIG. 9 illustrates examples of screens that are displayed for selecting a data service option, according to an embodiment of the present disclosure.

FIG. 9 illustrates examples of screens that are displayed on an electronic device for selecting a data service option, according to an embodiment of the present disclosure.

Referring to FIG. 9, if the electronic device is out of a network service area of an operator of a removable SIM, the electronic device may display screen 901 to notify a user that a data service option capable of using a data service different from a data service through the removable SIM exists, and to receive a user input about whether to use the data service option. As described above, the electronic device may use a data service through the secure memory with a condition (e.g., a data transfer rate, a data service charge, etc.) that is more advantageous than a data service by roaming of the removable SIM. Even though the electronic device uses the data service through the secure memory, the electronic device may maintain a connection with at least one of a CS network or an MIS network through the removable SIM. Accordingly, the electronic device may use a voice or data service that is provided using a phone number.

If a user of the electronic device selects "Yes" with respect to a question such as "Would you like to use a data service option?" in screen 901, the electronic device may transmit network information (e.g., MMC, MNC, latitude, longitude, etc.) of the electronic device, state information, etc., to a server of a data service operator, and the server of the data service operator may select a profile fit to the electronic device based on the received information. The electronic device may connect to the server of the data service operator or a sever providing the selected profile and may download the selected profile. If download of the selected profile is completed, the electronic device may use a data service through the secure memory.

Alternatively, the profile may be selected at the electronic device. For example, the electronic device may display information (e.g., an operator list, a data service type list, etc.) about a data service, which the electronic device is able to use at a current location thereof, on the display in screen 902. For example, if an operator of the removable SIM of the electronic device is a Korean company, but the electronic device is currently located in the U.S., the electronic device may display a list of U.S. operators (e.g., Verizon, AT&T, T-Mobile, Clearwire, and Sprint) providing a network service at a current location of the electronic device, on a screen thereof.

As described above, the electronic device may select at least one component, which is to be used for packet data transmission and reception of the electronic device, from among the removable SIM and the secure memory, in response to an occurrence of a data service change event. For example, the electronic device may select whether to use a data service through the secure memory, independently of the use of a voice or data service through the removable SIM. For example, even though a state of a network connected through the removable SIM is changed or the electronic device is out of a network service area of the removable SIM, the electronic device may use a separate data service through the secure memory, if the use of the data service through the secure memory is received through a user interface.

Figure 10:
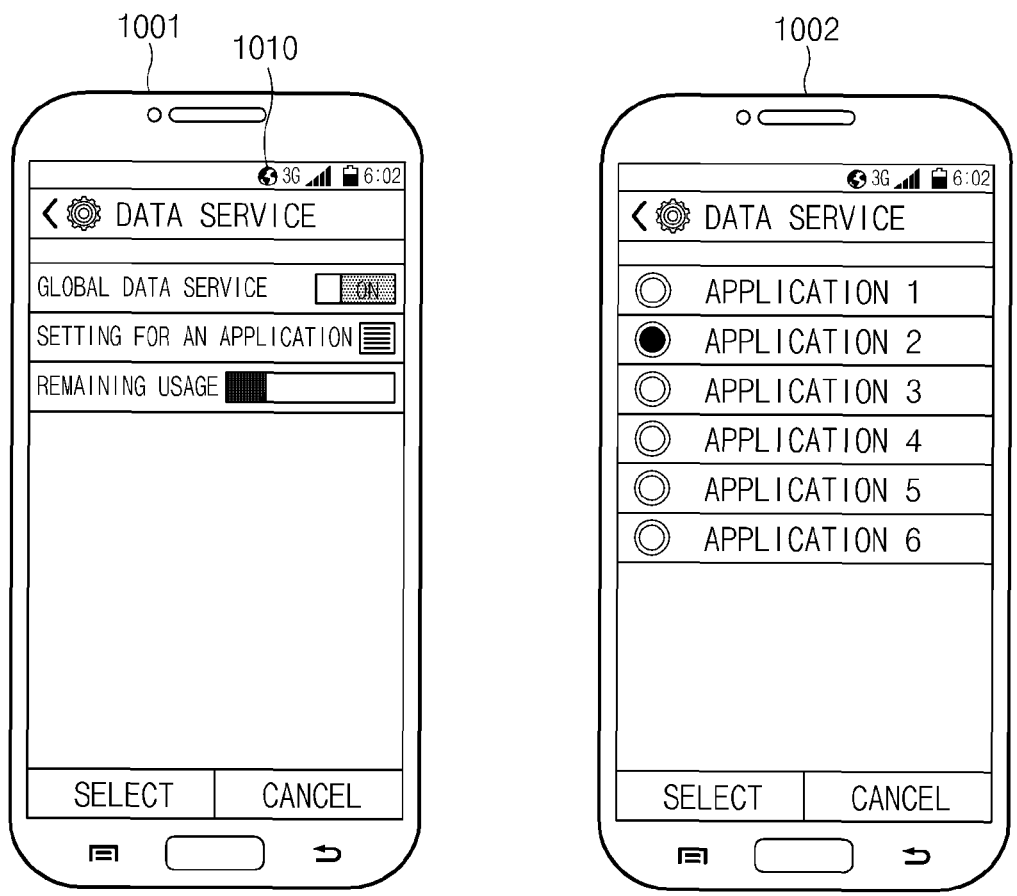
FIG. 10 illustrates examples of screens that are displayed for setting a data service option, according to an embodiment of the present disclosure.

FIG. 10 illustrates examples of screens that are displayed on an electronic device for setting a data service option, according to an embodiment of the present disclosure.

Referring to FIG. 10, the electronic device displays a screen 1001, through which a user may set a data service option through a user interface. Once the data service option is set, even though a state of a network connected through the removable SIM is changed or the electronic device is out of a network service area of the removable SIM, the electronic device may automatically use a data service through the secure memory, without asking the user whether to use the data service option.

If a global data service is set in the electronic device (on), a data service through the removable SIM may be automatically changed to a data service through the secure memory, when the electronic device is out of a network service area (e.g., outside of a country in which a network service to which the electronic device subscribes is provided) of an operator of the removable SIM.

As illustrated in screen 1001, the user may set whether to use the global data service. For example, when the electronic device is out of the network service area of the operator of the removable SIM and is set to use the global data service, as illustrated in screen 1002, the electronic device may display a list of currently usable data service plans (or an operator list) based on a current location of the electronic device or may allow the electronic device to automatically use a data service, which an operator or a third operator (an operator capable of providing a data service regardless of an area) affiliated with the operator of the removable SIM.

For example, the electronic device may download or enable a profile capable of being registered at a network of the affiliated operator, and thus, the electronic device may use a data service that the affiliated operator provides.

For example, as a user subscribes to a global data service that the third operator provides, the electronic device may automatically use a data service at a plurality of areas through once subscription without subscribing to a data service that a new operator of each area independently provides.

If a profile that is stored in the secure memory and is currently used corresponds to a prepayment data service plan, the electronic device may display the remaining usage of the data service that a corresponding profile provides. For example, the remaining usage of the data service that the corresponding profile provides may be determined according to the amount of packet used, a time, or a place.

The electronic device may display an indication that a user currently uses the data service option, on a state display bar at the top of a screen using, e.g., an icon 1010, letters, etc.

The electronic device may select a setting for an application at screen 1001 and may set whether to use the data service option, for an application as illustrated in screen 1002.

The electronic device may allow only a specific application to use the data service option using the secure memory. Accordingly, the electronic device may prevent data from being unnecessarily used by setting the data service option for an application.

The electronic device may update a route table if an application that will use the data service using the secure memory is selected at the electronic device. Whether an IP packet according to an application is transmitted through any network may be determined through the route table. A communication interface of the electronic device may transmit an IP packet according to an application setting to a network of a specific address, based on the route table.

As described above, the electronic device may transmit packet data through different networks for each application, based on the application setting.

If the global data service is turned off in screen 1001, a user interface, such as a setting for an application or the remaining data usage, may be disabled.

Figure 11:
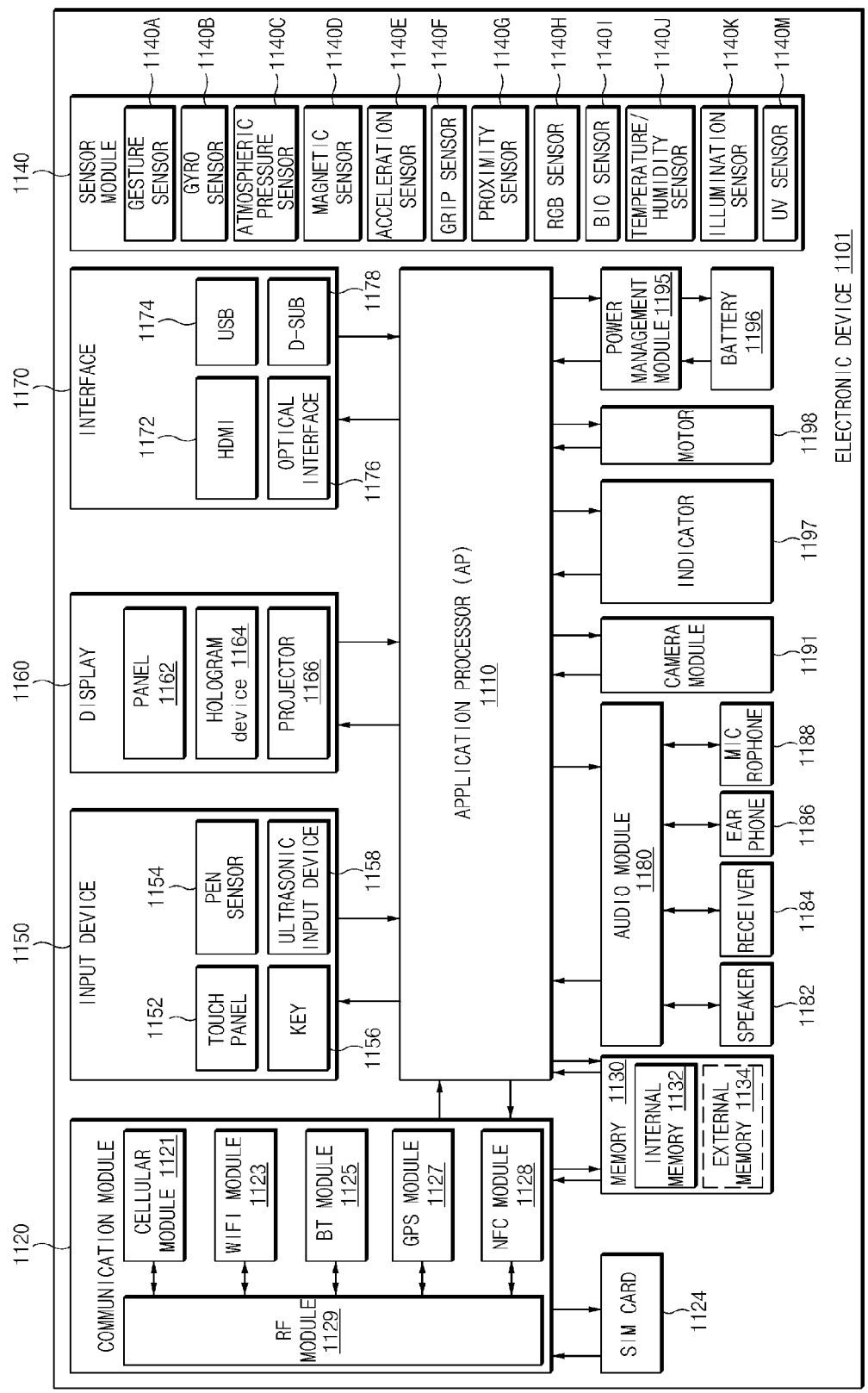
FIG. 11 illustrates an electronic device according to an embodiment of the present disclosure.

FIG. 11 is a block diagram illustrating an electronic device according to an embodiment of the present disclosure.

Referring to FIG. 11, the electronic device 1101 includes an application processor 1110, a communication module 1120, a SIM card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The application processor 1110 may drive an operating system (OS) or an application to control a plurality of hardware or software components connected thereto and may process and compute a variety of data. The application processor 1110 may be implemented with a System on Chip (SoC), for example. The application processor 1110 may further include a graphic processing unit (GPU) and/or an image signal processor. The application processor 1110 may include at least a part (e.g., a cellular module 1121) of the other components illustrated in FIG. 11. The application processor 1110 may load and process an instruction or data, which is received from at least one of other components (e.g., a nonvolatile memory), and may store a variety of data at a nonvolatile memory.

The communication module 1120 may be configured the same as or similar to the communication interface 160 of FIG. 1.

The communication module 1120 includes a cellular module 1121, a wireless-fidelity (Wi-Fi) module 1123, a Bluetooth (BT) module 1125, a global positioning system (GPS) module 1127, a near field communication (NFC) module 1128, and a radio frequency (RF) module 1129.

The cellular module 1121 may provide voice communication, video communication, a character service, an Internet service, etc., through a communication network. The cellular module 1121 may perform discrimination and authentication of the SIM card 1124. The cellular module 1121 may perform at least a portion of functions that the application processor 1110 provides. The cellular module 1121 may include a communication processor (CP).

Each of the Wi-Fi module 1123, the BT module 1125, the GPS module 1127, and the NFC module 1128 may include a processor for processing data exchanged through a corresponding module. At least a portion (e.g., two or more components) of the cellular module 1121, the Wi-Fi module 1123, the BT module 1125, the GPS module 1127, and the NFC module 1128 may be included within an Integrated Circuit (IC) or an IC package.

The RF module 1129 may transmit and receive a communication signal (e.g., an RF signal). The RF module 1129 may include a transceiver, a power amplifier module (PAM), a frequency filter, a low noise amplifier (LNA), an antenna, or the like. At least one of the cellular module 1121, the Wi-Fi module 1123, the BT module 1125, the GPS module 1127, or the NFC module 1128 may transmit and receive an RF signal through a separate RF module.

The SIM card 1124 may include unique identify information (e.g., integrated circuit card identifier (ICCID)) or subscriber information (e.g., integrated mobile subscriber identity (IMSI)).

The memory 1130 includes an internal memory 1132 or an external memory 1134. For example, the internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1134 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1134 may be functionally and/or physically connected to the electronic device 1101 through various interfaces.

The sensor module 1140 may measure, for example, a physical quantity or may detect an operation state of the electronic device 1101. The sensor module 1140 may convert the measured or detected information to an electric signal.

The sensor module 1140 includes a gesture sensor 1140A, a gyro sensor 1140B, an atmospheric pressure sensor 1140C, a magnetic sensor 1140D, an acceleration sensor 1140E, a grip sensor 1140F, a proximity sensor 1140E an RBG sensor 1140H, a BIO sensor 1140I, a temperature/humidity sensor 1140J, an illuminance sensor 1140K, and a UV sensor 1140M. Although not illustrated, additionally or alternatively, the sensor module 1140 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1140 may further include a control circuit for controlling at least one or more sensors included therein.

The electronic device 1101 may further include a processor which is a part of the application processor 1110 or independent of the application processor 1110 and is configured to control the sensor module 1140. The processor may control the sensor module 1140 while the application processor 1110 remains at a sleep state.

The input device 1150 includes a touch panel 1152, a (digital) pen sensor 1154, a key 1156, and an ultrasonic input unit 1158. The touch panel 1152 may use at least one of capacitive, resistive, infrared and ultrasonic detecting methods. Also, the touch panel 1152 may further include a control circuit. The touch panel 1152 may further include a tactile layer to provide a tactile reaction to a user.

The (digital) pen sensor 1154 may be, for example, a part of a touch panel or may include an additional sheet for recognition.

The key 1156 may include, for example, a physical button, an optical key, a keypad, and the like.

The ultrasonic input device 1158 may detect (or sense) an ultrasonic signal, which is generated from an input device, through a microphone (e.g., a microphone 1188) and may verify data corresponding to the detected ultrasonic signal.

The display 1160 includes a panel 1162, a hologram device 1164, and a projector 1166. The panel 1162 may be configured the same as or similar to a display 150 of FIG. 1. The panel 1162 may be implemented to be flexible, transparent or wearable, for example. The panel 1162 and the touch panel 1152 may be integrated into a single module.

The hologram device 1164 may display a stereoscopic image in a space using a light interference phenomenon.

The projector 1166 may project light onto a screen so as to display an image. The screen may be arranged in the inside or the outside of the electronic device 1101. The display 1160 may further include a control circuit for controlling the panel 1162, the hologram device 1164, and/or the projector 1166.

The interface 1170 includes a high-definition multimedia interface (HDMI) 1172, a universal serial bus (USB) 1174, an optical interface 1176, and a D-subminiature (D-sub) 1178. The interface 1170 may be included, for example, in a communication interface 160 illustrated in FIG. 1.

Additionally or alternatively, the interface 1170 may include, for example, a mobile high definition link (MHL) interface, a SD card/multi-media card (MMC) interface, or an infrared data association (IrDA) standard interface.

The audio module 1180 may convert a sound and an electric signal in dual directions. At least a portion of the audio module 1180 may be included, for example, in an input/output interface 140 illustrated in FIG. 1. The audio module 1180 may process, for example, sound information that is input or output through a speaker 1182, a receiver 1184, an earphone 1186, and/or the microphone 1188.

The camera module 1191, which is provided for shooting a still image or a video, may include, for example, at least one image sensor (e.g., a front sensor or a rear sensor), a lens, an image signal processor (ISP), or a flash (e.g., an LED or a xenon lamp)

The power management module 1195 may manage, for example, power of the electronic device 1101. A power management integrated circuit (PMIC) a charger IC, or a battery gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, etc. The battery gauge may measure, for example, a remaining capacity of the battery 1196 and a voltage, current or temperature thereof while the battery is charged. The battery 1196 may include, for example, a rechargeable battery or a solar battery.

The indicator 1197 may display a specific state of the electronic device 1101 or a portion thereof (e.g., the application processor 1110), such as a booting state, a message state, a charging state, etc.

The motor 1198 may convert an electrical signal into a mechanical vibration and may generate the following effects: vibration, haptic, etc.

Although not illustrated, a processing device (e.g., a GPU) for supporting a mobile TV may be included in the electronic device 1101. The processing device for supporting a mobile TV may process media data according to the standards of DMB, digital video broadcasting (DVB), MediaFlo™, etc.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Further, some of the elements of the electronic device according to various embodiments of the present disclosure may be combined with each other so as to form one entity, so that the functions of the elements may be performed in the same manner as before the combination.

Herein, the term "module" may represent, for example, a unit including one or more combinations of hardware, software and firmware. The term "module" may be interchangeably used with the terms "unit", "logic", "logical block", "component" and "circuit". A "module" may be a minimum unit of an integrated component or may be a part thereof. A "module" may be a minimum unit for performing one or more functions or a part thereof. A "module" may also be implemented mechanically or electronically. For example, a "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a program module. The instruction, when executed by one or more processors (e.g., a processor 120), may cause the one or more processors to perform a function corresponding to the instruction. The computer-readable storage media, for example, may be the memory 130.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

According to various embodiments of the present disclosure, a method for providing a data service and an electronic device supporting the same may provide an economical, efficient data service through at least one of a removable SIM or a secure memory of the electronic device in consideration of a situation such as a location of the electronic device, a network state, etc.

The electronic device may maintain a voice service using a phone number through a removable SIM and may select or download a profile through the secure memory in order to provide a data service corresponding to a current situation of the electronic device, thereby increasing user convenience. Because the electronic device may use one SIM card and a secure memory, the electronic device may provide convenient user experience and convenience of manipulation for a change of a data service, as if one SIM card is used.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a removable subscriber identifier module (SIM);
   an embedded SIM storing at least one profile;
   a communication interface electronically connected to the removable SIM and the embedded SIM; and
   a processor electronically connected to the communication interface, the processor configured to:
      select one of the removable SIM and the embedded SIM, to be used for packet data transmission and reception, in response to an occurrence of a data service change event; and
      control the communication interface to register the electronic device with a packet-switched (PS) network through the selected SIM and to transmit and receive packet data through the registered PS network,
   wherein the communication interface is configured to maintain a network connection of a circuit-switched (CS) network or an Internet protocol multimedia subsystem (IMS) through the removable SIM when the embedded SIM is selected; and
   wherein the communication interface is configured to block the network connection of the CS network or the IMS through the embedded SIM when the removable SIM is removed from the electronic device.

2. The electronic device of claim 1, wherein the data service change event comprises at least one of:
   a state change of a network connected through the removable SIM or the embedded SIM;
   identification that the electronic device is out of a network service area of a profile of the removable SIM or the embedded SIM; and
   a change of a setting about a data service.

3. The electronic device of claim 1, wherein if the embedded SIM is selected by the processor, and the processor is configured to control the communication interface to transmit and receive the packet data using at least one profile for the packet data transmission and reception, which is stored in the embedded SIM.

4. The electronic device of claim 3, wherein the communication interface receives information about a data service plan of the at least one profile through the embedded SIM, and wherein the processor selects the at least one profile based on the received information.

5. The electronic device of claim 1, wherein the processor is further configured to download at least one profile for the packet data transmission and reception, through the communication interface, if the embedded SIM is selected and does not include a profile usable for the packet data transmission and reception.

6. The electronic device of claim 5, wherein the communication interface downloads the at least one profile on the embedded SIM through a network registered using the removable SIM or a profile stored in the embedded SIM.

7. The electronic device of claim 5, wherein the communication interface transmits network information of the electronic device to a server providing a data service and downloads the at least one profile, in response to the transmission of the network information, to the embedded SIM.

8. The electronic device of claim 7, wherein the at least one profile is selected by a server providing the data service based on the network information.

9. The electronic device of claim 1, wherein the processor is further configured to:

select the at least one of the removable SIM and the embedded SIM to be used to transmit and receive packet data of a corresponding application, and set a route table, for the application, based on the selected at least one of the removable SIM and the embedded SIM.

10. A method for providing a data service by an electronic device including a removable subscriber identifier module (SIM) and an embedded SIM, the method comprising:

detecting an occurrence of a data service change event;

selecting one of the removable SIM and the embedded SIM, to be used for packet data transmission and reception, in response to the occurrence of the data service change event;

registering the electronic device with a packet-switched (PS) network through the selected SIM;

transmitting and receiving the packet data through the registered PS network;

maintaining a network connection of a circuit-switched (CS) network or an Internet protocol multimedia subsystem (IMS) through the removable SIM when the embedded SIM is selected; and blocking the network connection of the CS network or the IMS through the embedded SIM when the removable SIM is removed from the electronic device.

11. The method of claim 10, wherein the data service change event comprises at least one of a state change of a network connected through the removable SIM or the embedded SIM, identification that the electronic device is out of a network service area of a profile of the removable SIM or the embedded SIM, or a change of a setting about a data service.

12. The method of claim 10, wherein selecting the at least one of the removable SIM and the embedded SIM comprises:

selecting the at least one of the removable SIM and the embedded SIM for the packet data transmission and reception of a corresponding application; and setting a route table for the application, based on the selected at least one of the removable SIM and the embedded SIM.

13. The method of claim 10, wherein transmitting and receiving the packet data through the registered network comprises:

transmitting and receiving the packet data using at least one profile that is stored in the embedded SIM, when the embedded SIM is selected.

14. The method of claim 13, further comprising downloading at least one profile for the packet data transmission and reception, when the embedded SIM is selected and does not include a profile usable for the packet data transmission and reception.

* * * * *